United States Patent [19]

Grierson et al.

[11] Patent Number: 4,469,967

[45] Date of Patent: Sep. 4, 1984

[54] ELECTRIC MOTOR COIL-RETAINING MEANS

[75] Inventors: Keith J. Grierson; Eugene H. Mokrzycki, both of Ramsey County, Minn.

[73] Assignee: Whirlpool Corporation, Benton Harbor, Mich.

[21] Appl. No.: 386,183

[22] Filed: Jun. 7, 1982

[51] Int. Cl.³ ............................................ H02K 11/00
[52] U.S. Cl. ...................................... 310/71; 310/194
[58] Field of Search ............... 310/71, 184, 260, 270, 310/216–218, 89, 43

[56] References Cited

U.S. PATENT DOCUMENTS

| | | | |
|---|---|---|---|
| 3,027,475 | 3/1962 | Gaudry | 310/260 |
| 3,161,794 | 12/1964 | Lindgren | 310/89 |
| 3,189,772 | 6/1965 | Wingler et al. | 310/162 |
| 3,226,585 | 12/1965 | Roe | 310/194 |
| 3,725,707 | 4/1973 | Leimbach et al. | 310/71 |
| 3,760,339 | 9/1973 | Marshall | 339/221 |
| 3,780,323 | 12/1973 | Swain | 310/43 |
| 3,979,615 | 9/1976 | Neff | 310/71 |
| 4,003,128 | 1/1977 | Dochterman | 29/596 |
| 4,038,573 | 7/1977 | Hillyer et al. | 310/71 |
| 4,071,793 | 1/1978 | Cox | 310/71 |
| 4,161,669 | 7/1979 | Aimar | 310/194 |
| 4,340,829 | 7/1982 | McCoy | 310/194 X |

*Primary Examiner*—Donovan F. Duggan
*Attorney, Agent, or Firm*—Wood, Dalton, Phillips, Mason & Rowe

[57] ABSTRACT

Coil retainer structure for use in an electric motor. The coil retainer extends about the periphery of an end face of the motor core and includes an offset portion extending about the periphery of the core axially inwardly of the end face to permit a housing member to have a portion thereof facially abutted to the core end face adjacent the offset portion. A coil is wound on the core and has a portion retained by the retainer. Securing structure is provided for securing the housing member directly to the core in facially abutted relationship with the adjacent end face. In the illustrated embodiment, coil retainers having such offset portions are provided at each of the opposite end faces of the core. One of the coil retainers is further provided with coil end terminal structure adjacent the offset portion.

11 Claims, 7 Drawing Figures

ELECTRIC MOTOR COIL-RETAINING MEANS

BACKGROUND OF THE INVENTION

1. Field of the Invention

This invention relates to the use of coil retainers in association with an electric motor core.

2. Description of the Prior Art

In the manufacture of electric motors, a motor field coil is wound about a laminated core and provided with lead end terminals. One example of such an electric motor assembly is illustrated in U.S. Pat. No. 3,979,615, of Nelson E. Neff. As shown therein, a one-piece connector housing is mounted concentrically on one end of the stack of core laminations. The plastic connector housing has an annular base of generally the same diameter as that of the laminations and is secured onto the end face of the stack by suitable pins.

In U.S. Pat. No. 3,725,707, Wendell B. Leimbach et al disclose a field sub-assembly for universal electric motors having a core with a pair of coils wound in the slots thereof. The coil ends are connected to lead wires by means of a connector insulatively mounted on the field core.

SUMMARY OF THE INVENTION

The present invention comprehends an improved coil retainer and terminal housing structure for use in providing improved winding of the coils about the motor core and providing improved electrical terminal connection means.

In the illustrated embodiment, the coil retainer includes an offset portion extending about the periphery of the core stack axially inwardly of an end face thereof so as to permit a motor housing member portion to be facially abutted with the core end face in providing an improved mounting of the motor housing member to the core.

In the illustrated embodiment, the motor housing includes a pair of end members facially abutted directly to opposite end faces of the core, as permitted by the provision of the offset portions of the annular coil retainer.

The terminal housing structures are provided at opposite ends of the offset portions of the retainer on one end of the core, in the illustrated embodiment.

By permitting the motor housing members to rest directly on the end laminations of the core, cold flow of portions of the coil retainer, which may be formed of a suitable synthetic resin, is effectively prevented. As a result, the problems of dimensional instability and loosening of the assembly of the motor structure, as has occurred in the prior art devices, is effectively eliminated.

The coil retainer and terminal housing means of the present invention is extremely simple and economical of construction and of a suitable synthetic resin to retain the terminals in the housings while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
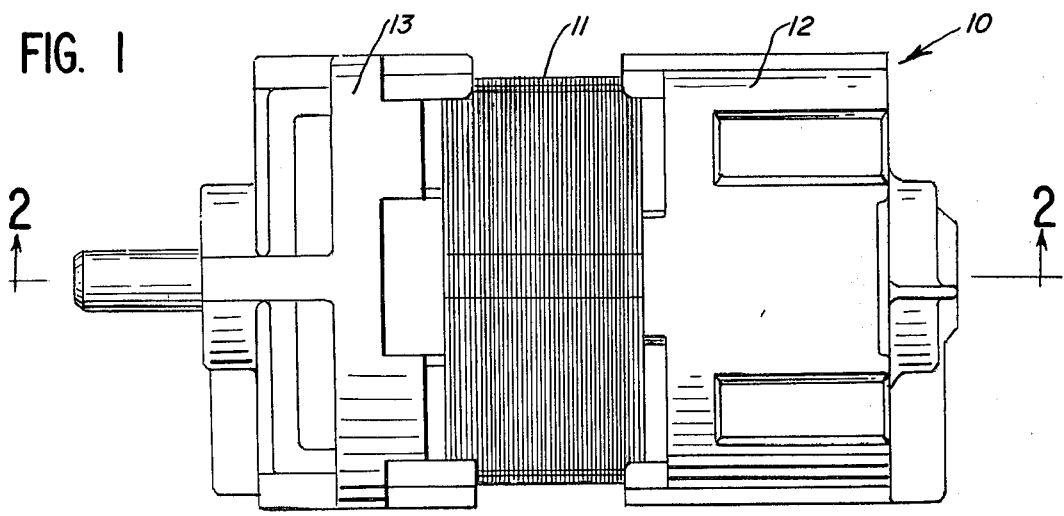
FIG. 1 is a side elevation of an electric motor having coil retainers embodying the invention.

In the illustrative embodiment of the invention as disclosed in the drawing, an electric motor generally designated 10 is shown to include a core 11, a first motor housing member 12, and a second motor housing member 13. The housing members 12 and 13 may be molded from a suitable plastic such as a thermal setting synthetic resin. An armature 14 is journaled in suitable bearings 15 and 16 and is provided with an output shaft 17 rotatable coaxially within the core 11. The core is provided with a pair of field windings 18. The present invention is concerned with an improved coil retainer means associated with the core for facilitating and providing improved automatic winding of the coil in association therewith and for providing improved automatic electrical terminal connection means.

More specifically, the coil retaining means includes a first annular coil retainer 19 extending about the periphery of a first end face 20 of the core and a second annular coil retainer 21 extending about the periphery of the opposite end face 22 of the core. First coil retainer 19 is provided with a pair of outwardly opening U-shaped coil turn receiving portions 23 in which portions of the coil 18 are received for improved automatic winding of the coil about the core. The second retainer 21 is provided with a similar pair of coil turn receiving portions 24, as illustrated in FIG. 4.

Figure 3:
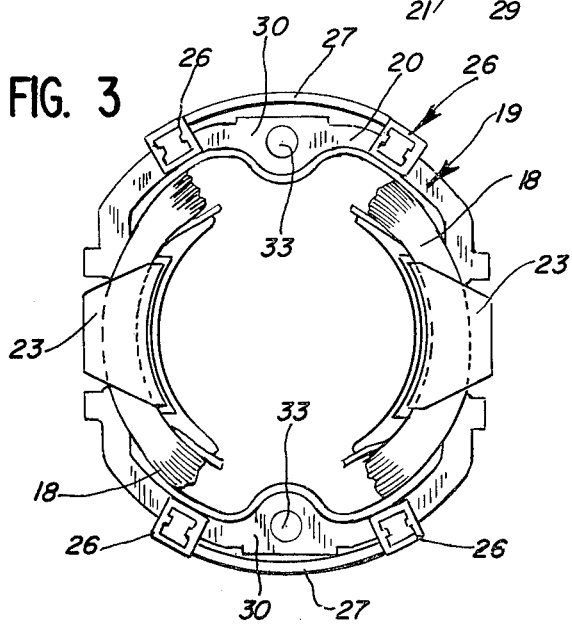
FIG. 3 is an end elevation of a coil retainer and terminal housing structure embodying the invention.
Figure 4:
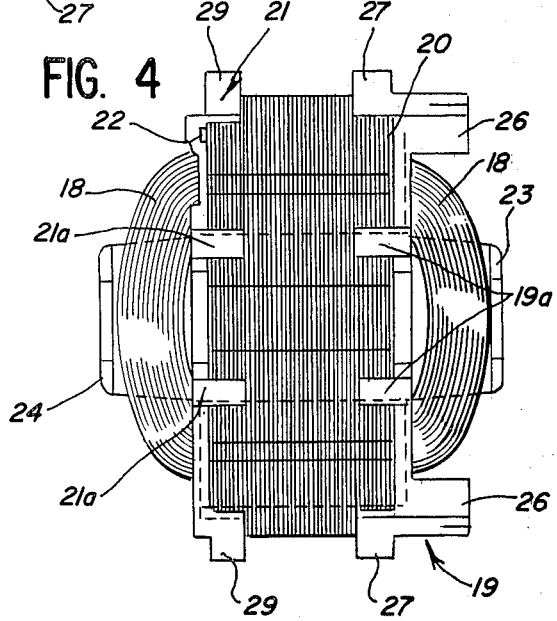
FIG. 4 is a side elevation of the core and coil retainer subassembly of the electric motor.

As further shown in FIGS. 3 and 4, coil retainer 19 defines a plurality of terminal housing structures 26 each adapted to receive a coil end interconnect terminal for providing electrical connections to the coil in the motor. The terminals, not shown since they are well known in the art and not part of the invention, may advantageously be conventional AMP Incorporated 62421-1 interconnect terminals to facilitate automatic connection of the field coil magnet wire leaders. Each terminal receives one end lead of a field coil, and strips the insulation from an end portion of the lead, holds the lead fastened to the terminal, and provides a connector to receive the circuit conductor which connects the field coil to the motor circuit all in accord with conventional practice. The terminals may advantageously be provided with barbs to secure them in the cavities of terminal housing structures 26.

Figure 2:
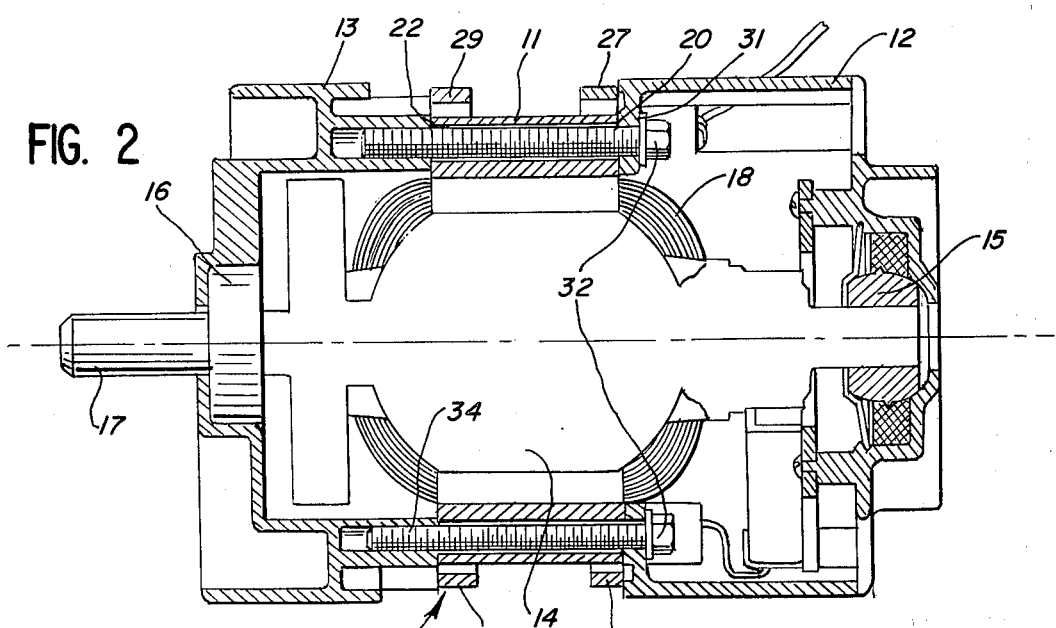
FIG. 2 is a diametric longitudinal section thereof.
Figure 5:
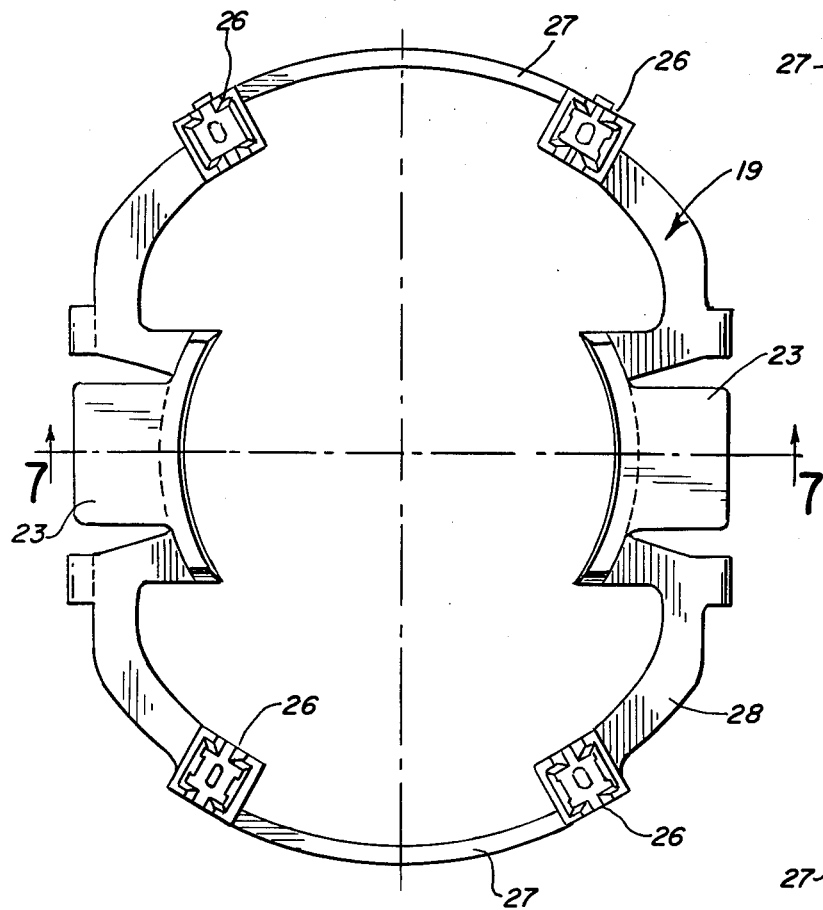
FIG. 5 is a plan view of the coil retainer and terminal housing structure of the present invention.
Figure 6:
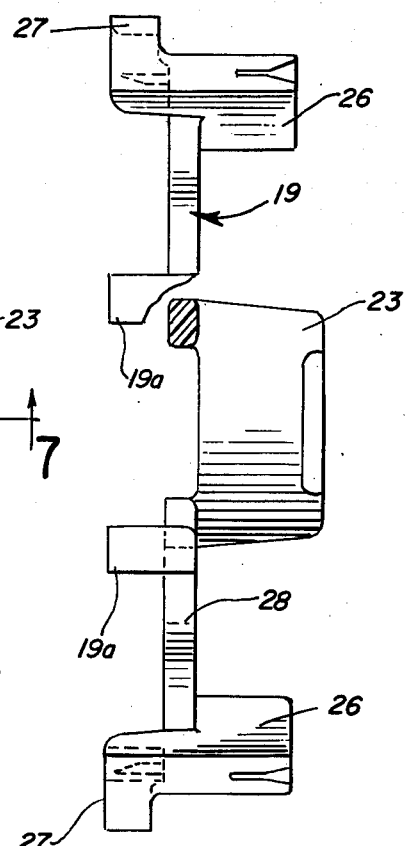
FIG. 6 is a side elevation of the coil retainer structure of FIG. 5 with portions broken away to facilitate understanding of the structure thereof.
Figure 7:
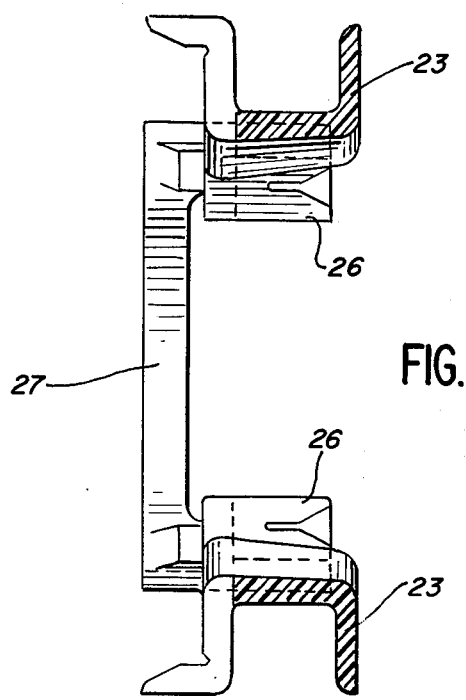
FIG. 7 is a transverse section taken substantially along the line 7—7 of FIG. 5.

The coil retainers comprise annular structures adapted to fit about the end faces 20 and 22 of the motor core. Thus, as seen in FIG. 5, coil retainer 19 defines a one-piece, generally annular structure formed of a suitable material, such as a glass filled nylon. As shown, the coil turn receiving portions 23 are disposed at diametrically opposite portions of the coil retainer and the terminal housings or cavities 26 are provided in pairs spaced apart in a direction perpendicular thereto. The coil retainer includes radially offset portions 27 extending arcuately around portions of the core between the opposite pairs of terminal housings 26 as shown in FIG. 3. More specifically, as seen in FIG. 6, the offset portions 27 are disposed below the level of the base portion 28 of the retainer. Resultingly, as seen in FIGS. 2 and 3, the offset portions 27 of the retainer 19 extend about the periphery of the core 11 axially inwardly of the core end face 20. The coil retainer 19 includes a plurality of spaced, locating and retaining tab members 19a about its periphery, which rest against the core stack and locate the retainer on the stack. Similarly, as seen in FIG. 2, coil retainer 21 is provided with offset portions 29 which extend about the periphery of the core axially inwardly of the opposite end face 22. As seen in FIG. 3, this arrangement of the offset portions exposes a portion 30 of the core end face 20 for direct facial abutment by a portion 31 of the housing member 12. As illustrated in FIG. 2, housing member portion 31 is secured in such direct facial engagement with the end face of the core by suitable bolts 32 extending through suitable openings 33 in the core and threaded into the opposite housing member 13 through the opposite end face 22. Retainer 21 also includes a plurality of spaced locating and retaining tab members 21a about its periphery to help locate the retainer on the core stack.

Similarly, housing member 13 defines an end portion 34 which is directly facially abutted with a portion of the end face 22 corresponding to portion 30 of end face 20, as a result of the offset arrangement of the retainer portion 29. Resultingly, the housing members engage directly against the opposite ends of the core without any portion of the thermoplastic glass filled nylon coil retainer sandwiched therebetween, thereby eliminating cold flow problems which have occurred in the motor constructions of the prior art, resulting in dimensional changes and loosening of the assembly, adversely affecting the useful life of the motor.

The improved coil retainers facilitate automatic winding of the field coils, with the end turns thereof being received in the coil turn receiving portions 23 and 24 of the respective coil retainers. Upon completion of the winding of the field coils, the end wires are automatically inserted into the terminal housing structures 26 to be electrically and mechanically secured therein.

The foregoing disclosure of specific embodiments is illustrative of the broad inventive concepts comprehended by the invention.

I claim:

1. In an electric motor having a laminated core defining an end face, and a housing member adjacent said end face, the improvement comprising:
   an annular coil retainer extending fully along the periphery of the core end face, said coil retainer having a first portion outwardly facially juxtaposed to said core end face and a transversely outwardly offset second portion extending about the periphery of the core inwardly of said end face, said housing member having a portion facially abutted directly to said core end face adjacent said retainer offset portion;
   a coil wound on said core and having a portion retained by said retainer; and
   securing means for securing said housing member directly to said core in the facially abutted relationship and with said first portion of the coil retainer clamped between the housing member and core.

2. The electric motor structure of claim 1 wherein said securing means is disposed transversely adjacent said offset portion of the retainer.

3. The electric motor structure of claim 1 wherein said coil retainer is provided with coil end terminal means adjacent said offset portion.

4. The electric motor structure of claim 1 wherein said coil retainer is provided with coil end terminal means at annularly opposite ends of said offset portions.

5. The electric motor structure of claim 1 wherein said coil retainer is provided with a plurality of spaced tab members to locate said retainer relative to the periphery of said core.

6. The electric motor structure of claim 1 wherein said securing means comprises bolt means extending through said housing member portion and core end face.

7. In an electric motor having a laminated core defining opposite first and second end faces, and first and second housing members disposed one each adjacent said end faces, the improvement comprising:
   first and second annular coil retainers extending one each fully along the periphery of the first and second core end faces, said first coil retainer having a first portion outwardly facially juxtaposed to said first core end face and a transversely outwardly offset second portion extending about the periphery of the core inwardly of said first end face, said second coil retainer having a portion outwardly facially juxtaposed to said second core end face and an offset portion extending about the periphery of the core inwardly of said second end face, said first housing member having a portion facially abutted to said first core end face adjacent said first coil retainer offset portion, and said second housing member having a portion facially abutted to said second core end face adjacent said second coil retainer offset portion;
   a coil wound on said core and having portions retained by said retainers; and
   securing means for securing said first and second housing members to said core in facially abutted relationship with said first and second core end faces respectively and with said first portions thereof respectively clamped between the housing members respectively and said opposite core faces.

8. The electric motor structure of claim 7 wherein said securing means extends through said first housing member portion and said core, and into secured relationship with said second housing member portion.

9. The electric motor structure of claim 7 wherein said securing means extends through said first housing member portion adjacent said first coil retainer offset portion and said core, and into secured relationship with said second housing member portion.

10. The electric motor structure of claim 7 wherein said securing means extends through said first housing member portion adjacent said first coil retainer offset portion and said core, and into secured relationship with said second housing member portion adjacent said second coil retainer offset portion.

11. The electric motor structure of claim 7 wherein said securing means extends through said first housing member portion transversely inwardly adjacent said first coil retainer offset portion and said core, and into secured relationship with said second housing member portion transversely inwardly adjacent said second coil retainer offset portion, said first coil retainer being provided with coil end terminal means adjacent said offset portion thereof.

* * * * *